United States Patent [19]

Fasel

[11] Patent Number: 4,896,251

[45] Date of Patent: Jan. 23, 1990

[54] AUXILIARY TURN SIGNAL ATTACHMENT

[76] Inventor: Albert J. Fasel, 97 W. Silver Lake Road N., Traverse City, Mich. 49684

[21] Appl. No.: 280,505

[22] Filed: Dec. 6, 1988

[51] Int. Cl.$^4$ .............................................. B60Q 1/38
[52] U.S. Cl. ................................... 362/80.1; 362/362
[58] Field of Search .................. 362/61, 80, 362, 80.1

[56] References Cited

U.S. PATENT DOCUMENTS

| 1,646,159 | 10/1927 | Metherd | 362/61 |
|---|---|---|---|
| 1,857,210 | 5/1932 | Nelson et al. | 362/362 |
| 2,081,790 | 5/1937 | Braun | 362/61 |
| 4,449,167 | 3/1984 | Cohen | 362/362 |
| 4,463,411 | 7/1984 | Proctor | 362/61 |
| 4,602,320 | 7/1986 | Tomkin et al. | 362/80 |
| 4,613,927 | 9/1986 | Brandt | 362/32 |
| 4,626,967 | 12/1986 | Segoshi | 362/61 |
| 4,703,398 | 10/1987 | Huth et al. | 362/61 |
| 4,736,280 | 4/1988 | Simidian | 362/80 |
| 4,758,931 | 7/1988 | Gabaldon | 362/61 |

Primary Examiner—Ira S. Lazarus
Assistant Examiner—Sue Hagarman
Attorney, Agent, or Firm—Jerry T. Kearns

[57] ABSTRACT

An auxiliary turn signal indicating light attachment includes a generally rectangular housing having arcuate end walls. A pair of indicating light compartments are formed at opposite ends of the housing and each enclose a turn signal indicating light. A central section in the housing separates the two compartments. In a first embodiment an auxiliary brake indicating light may be disposed in the central section, and in a second embodiment the central section defines a recess dimensioned to straddle an existing auxiliary brake light mounted on the rear deck adjacent the rear window of a vehicle. A pair of spaced mounting brackets are pivotally secured to a pair of rods slidably received within a pair of apertured mounting tabs within the housing. A set screw associated with each mounting tab is utilized to secure the rods in a selected adjusted position. By virtue of this arrangement, the elevation and inclination of the housing may be adjusted with respect to the intended mounting surface to enable usage with a wide variety of differently configured vehicles.

5 Claims, 4 Drawing Sheets

AUXILIARY TURN SIGNAL ATTACHMENT

BACKGROUND OF THE INVENTION

1. Field of the Invention

The present invention relates to auxiliary indicating light attachments, and more particularly pertains to a new and improved auxiliary turn signal attachment adapted for mounting on the rear deck, adjacent the rear window of a vehicle. Conventional turn signals are sometimes difficult to see, because of the low level at which they are mounted and also due to a coating of accumulated dirt on the outer surface of the exposed tail light lens. Additionally, sunlight reflected from the bumper of a vehicle may obscure the turn signal indicating light. In order to overcome these problems, the present invention provides an auxiliary turn signal indicating light attachment, adapted to be mounted at eye level, on the rear deck adjacent the rear window of a vehicle. Many vehicles, as now required by law, provide an eye level auxiliary brake light mounted on the rear deck. The present invention discloses a turn signal indicating light attachment adapted to straddle this existing auxiliary brake light.

2. Description of the Prior Art

Various types of auxiliarY indicating light attachments are known in the prior art. A typical example of such an auxiliary indicating light attachment is to be found in U.S. Pat. No. 4,463,411, which issued to R. Proctor on July 31, 1984. This patent discloses a supplementary upper brake light for use on vehicles, comprising a brake light casing with at least one adhesive pad or strip for attachment of the brake light to the inside surface of a vehicle rear window. U.S. Pat. No. 4,602,320, which issued to D. Tomkin et al on July 22, 1986, discloses adjustable safety lamps for mounting upon the rear window of an automobile. An eye level brake lamp, includes a frame together with adhesive securing strips for securing the frame upon the vehicle rear window and as an outer housing having an open side secured at its perimeter to the frame and an inner housing enclosing an indicating lamp. The inner housing is rotatably supported within the outer housing, such that the lamp is directed toward the open side of the outer housing and through the frame at eye level with respect to the driver of a vehicle approaching from the rear. U.S. Pat. No. 4,613,927, which issued to W. Brandt on Sept. 23, 1986, discloses a signal indicator for an automobile in the form of a reduced sized model of an automobile mounted behind the rear window of the automobile. Light bulbs inside the indicator are activated by the turn signals, brakes, back up signals, tail lights and emergencY flashers of the automobile. U.S. Pat. No. 4,626,967, which issued to T. Segoshi on Dec. 2, 1986, discloses an auxiliary stop or turn indication lamp which may be mounted either immediately adjacent the rear windshield or housed on top of the trunk lid of an automobile. A light bulb is arranged in an essentially vertically extending base section of the housing so that the filament thereof is located at a level just above that of the floor of an elongate capsule-like upper section provided on top of the base member. The filament is arranged parallel with a lens or similar light transmissive member which is disposed in an opening formed in the upper section. U.S. Pat. No. 4,703,398, which issued to L. Huth et al on Oct. 27, 1987, discloses an auxiliary brake light for motor vehicles which consists of a socket mounted on the rear deck and a light housing pivotally mounted on the socket towards the rear window. The auxiliary brake light includes means for sealing the light exit surface with respect to the rear window for preventing stray light. The housing is displaceably and pivotally connected with the socket by bolts engaging guide channels and at least one resilient tongue projecting from the socket adapted to be connected with the housing in a detent-like manner.

While the above mentioned devices are suited for their intended usage, none of these devices disclose an auxiliary turn signal indicating light attachment having a housing provided with an adjustable mounting bracket enabling the inclination and elevation of the housing to be adjusted with respect to an intended mounting surface. Additionally, none of the aforesaid indicating light attachment devices disclose the use of a housing having spaced indicating light compartments separated by a recessed central section dimensioned to straddle an existing auxiliary brake light. Inasmuch as the art is relatively crowded with respect to these various types of auxiliary indicating light attachments, it can be appreciated that there is a continuing need for and interest in improvements to such auxiliarY indicating light attachments, and in this respect, the present invention addresses this need and interest.

SUMMARY OF THE INVENTION

In view of the foregoing disadvantages inherent in the known types of auxiliary indicating light attachments now present in the prior art, the present invention provides an improved auxiliary turn signal attachment. As such, the general purpose of the present invention, which will be described subsequently in greater detail, is to provide a new and improved auxiliary turn signal attachment which has all the advantages of the prior art auxiliary indicating light attachments and none of the disadvantages.

To attain this, representative embodiments of the concepts of the present invention are illustrated in the drawings and make use of a generally rectangular housing having arcuate end walls. A pair of indicating light compartments are formed at opposite ends of the housing and each enclose a turn signal indicating light. A central section in the housing separates the two compartments. In a first embodiment an auxiliary brake indicating light may be disposed in the central section, and in a second embodiment the central section defines a recess dimensioned to straddle an existing auxiliary brake light mounted on the rear deck, adjacent the rear window of a vehicle. A pair of spaced mounting brackets are pivotally secured to a pair of rods slidably received within a pair of apertured mounting tabs within the housing. A set screw associated with each mounting tab is utilized to secure the rods in a selected adjusted position. By virtue of this arrangement, the elevation and inclination of the housing may be adjusted with respect to the intended mounting surface to enable usage with a wide varietY of differently configured vehicles.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved auxiliary turn signal attachment which has all the advantages of the prior art auxiliary indicating light attachments and none of the disadvantages.

It is another object of the present invention to provide a new and improved auxiliary turn signal attachment which may be easily and efficiently manufactured and marketed.

It is a further object of the present invention to provide a new and improved auxiliary turn signal attachment which is of a durable and reliable construction.

An even further object of the present invention is to provide a new and improved auxiliary turn signal attachment which is susceptible of a low cost of manufacture with regard to both materials and labor, and which accordingly is then susceptible of low prices of sale to the consuming public, thereby making such auxiliary indicating light attachments economically available to the buying public.

Still yet another object of the present invention is to provide a new and improved auxiliary turn signal attachment which provides in the apparatuses and methods of the prior art some of the advantages thereof, while simultaneously overcoming some of the disadvantages normally associated therewith.

Still another object of the present invention is to provide a new and improved auxiliary turn signal attachment including adjustable mounting brackets enabling adjustment of the elevation and inclination of the attachment with respect to an intended mounting surface.

Yet another object of the present invention is to provide a new and improved auxiliary turn signal attachment having a housing provided with a recessed central section dimensioned to straddle an existing auxiliary brake light.

Even still another object of the present invention is to provide a new and improved auxiliary turn signal attachment which provides integrated turn signal and brake indicating lights disposed in a common housing mounted for compound adjustment with respect to the rear deck of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
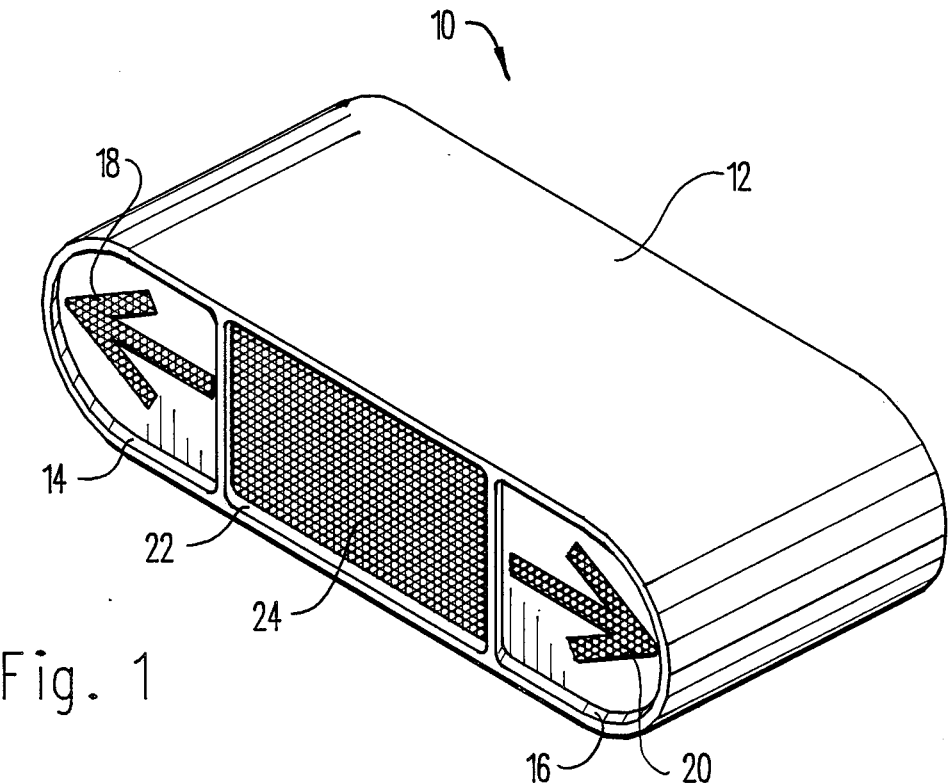
FIG. 1 is a perspective view of the indicating light attachment according to a first embodiment of the present invention.

With reference now to the drawings, and in particular to FIG. 1 thereof, a new and improved auxiliary turn signal attachment embodying the principles and concepts of the present invention and generally designated by the reference numeral 10 will be described.

More specifically, it will be noted that the first embodiment 10 of the invention includes a generally rectangular housing 12 having opposed arcuate end walls. A pair of indicating light compartments 14 and 16 are formed at opposite ends of the housing 12. A pair of amber lenses 18 and 20, each having a translucent window configured as an indicating arrow, form a wall of each of the compartments 14 and 16. A central section 22 of the housing 12 encloses a brake indicating light and has one wall formed by a translucent red lens 24.

Figure 2:
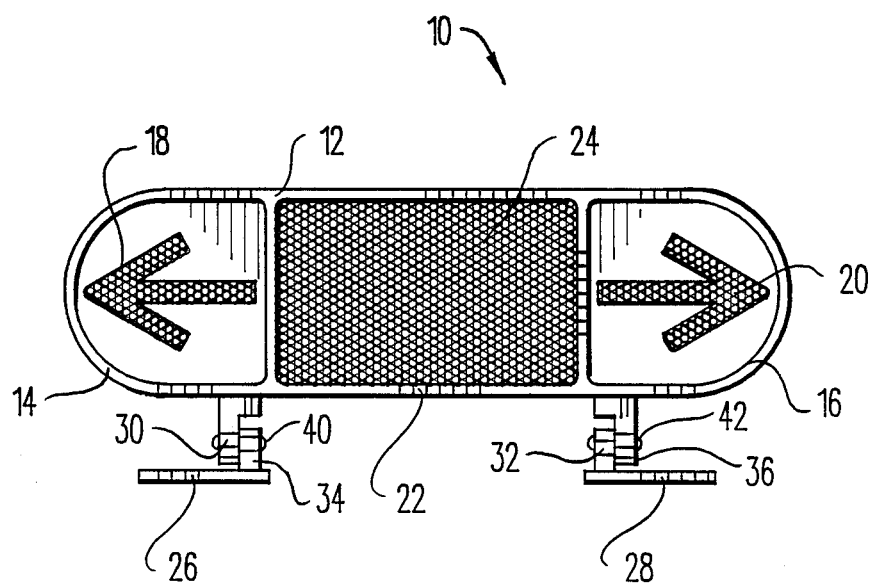
FIG. 2 is a front view of the device of FIG. 1.

As shown in the front view of FIG. 2, a pair of spaced brackets 26 and 28 have upwardly extending vertical tab portions 32 and 34 secured by pivot pins 40 and 42 to respective yoke portion 30 and 36 of vertically extending cylindrical rods. The rods 30 and 36 extend through a floor portion of the housing 12 and into the interior of the compartments 14 and 16. The pivot pins 40 and 42 provide for the adjustment of the inclination of the housing 12 with respect to the horizontal surface of the mounting brackets 26 and 28. The mounting brackets 26 and 28 are adapted for securement by conventional threaded fasteners through the horizontal rear deck surface, adjacent the rear window of a vehicle. The pivot pins 40 and 42 allow a stiff adjustment of the rods 30 and 36 with respect to the tab portions 32 and 34, and may be replaced by a pivot bolt, if so desired.

Figure 3:
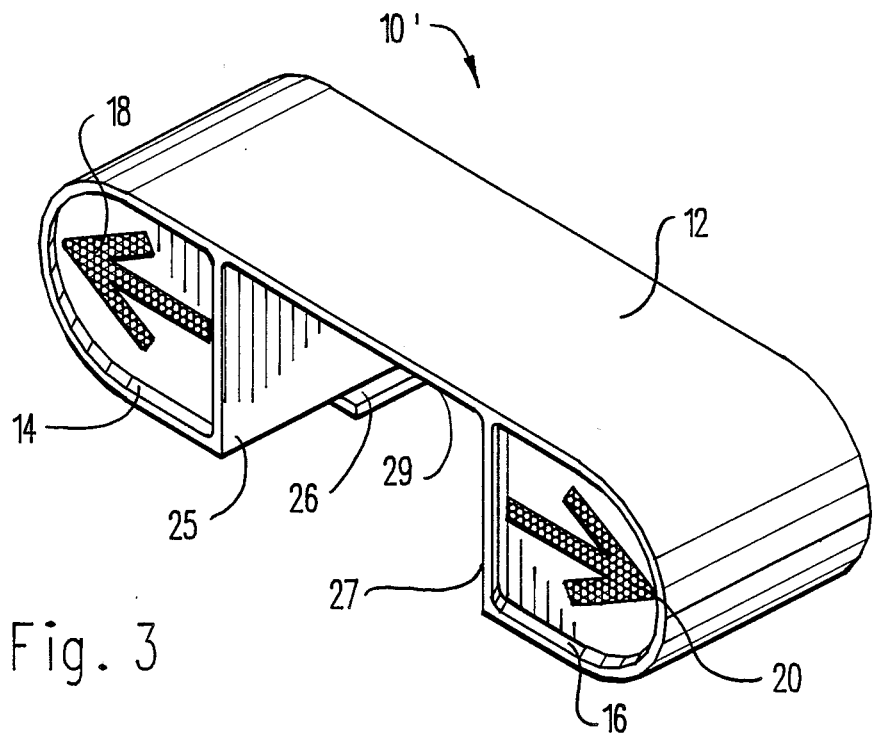
FIG. 3 is a perspective view illustrating an indicating light attachment according to a second embodiment of the present invention.

FIG. 3 illustrates a perspective view of a second embodiment 10' of the present invention. The central section of the housing 12 forms a recess area defined by opposed side walls 25 and 27 and a top wall 29. The recessed area is dimensioned to straddle an existing brake light attachment mounted on the rear deck, adjacent the rear window of a vehicle.

Figure 4:
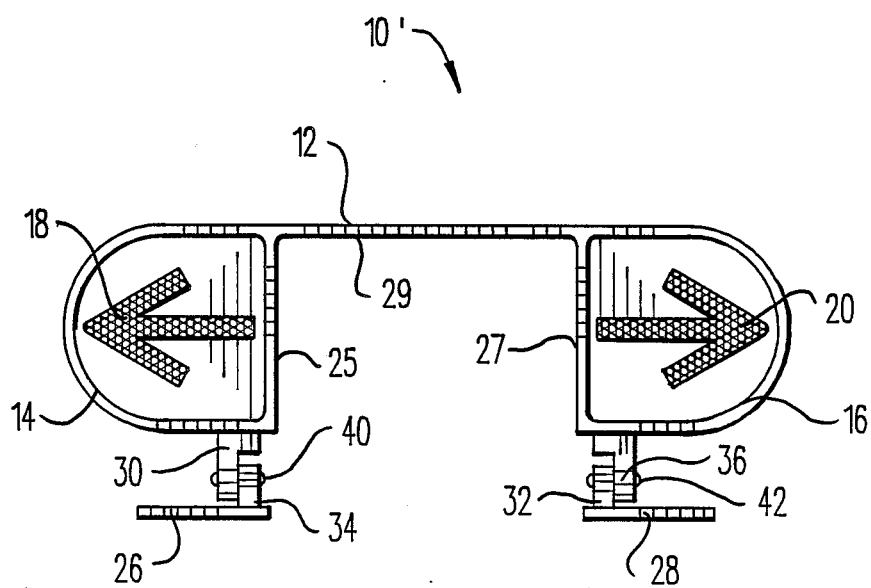
FIG. 4 is a front view of the device of FIG. 3.

FIG. 4 provides a front view of the second embodiment 10'. The mounting bracket arrangement is identically formed with respect to the mounting bracket of the first embodiment 10, previously described with reference to FIG. 2.

Figure 5:
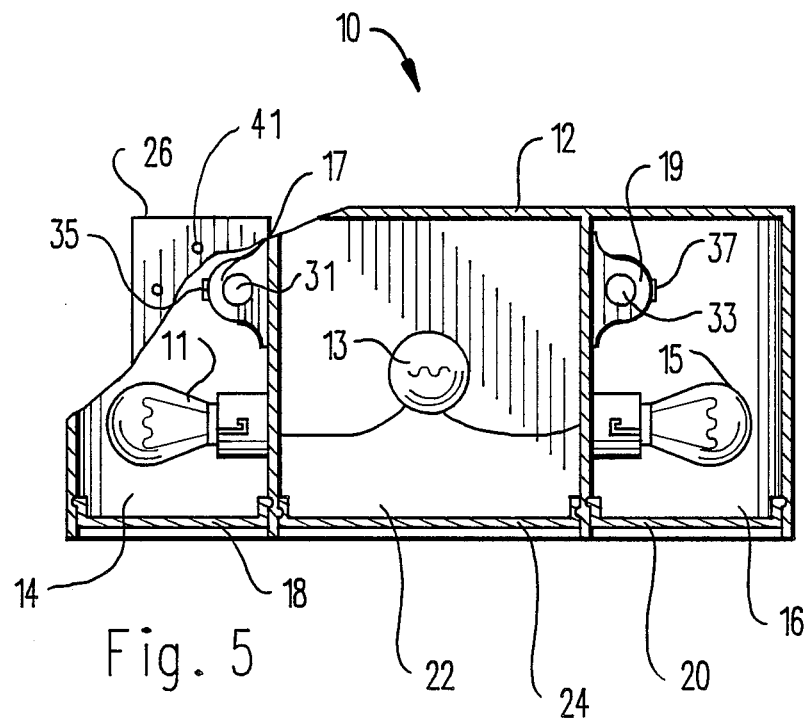
FIG. 5 is a top view, partially in cross section, illustrating the constructional details of the device of FIG. 1.

FIG. 5 provides a top view, partially cut away and in cross section, illustrating the interior construction of the first embodiment 10 of the invention. The compartments 14 and 16 enclose respective turn signal indicating lamps 11 and 15, which are connected in a conventional fashion to the electrical system of the vehicle. The horizontal surface of the mounting bracket 26 includes a plurality of apertures 41 dimensioned for the reception of conventional threaded fasteners for use in securing the mounting bracket 26 to the horizontal surface of the rear deck portion of the vehicle. The central section 22 of the housing 12 encloses a brake indicating light 13, conventionally connected to the electrical system of the vehicle. Amber lenses 18 and 20 form one wall of the compartments 14 and 16 and a red lens 24 forms one wall of the central section 22.

Figures 6, 7:
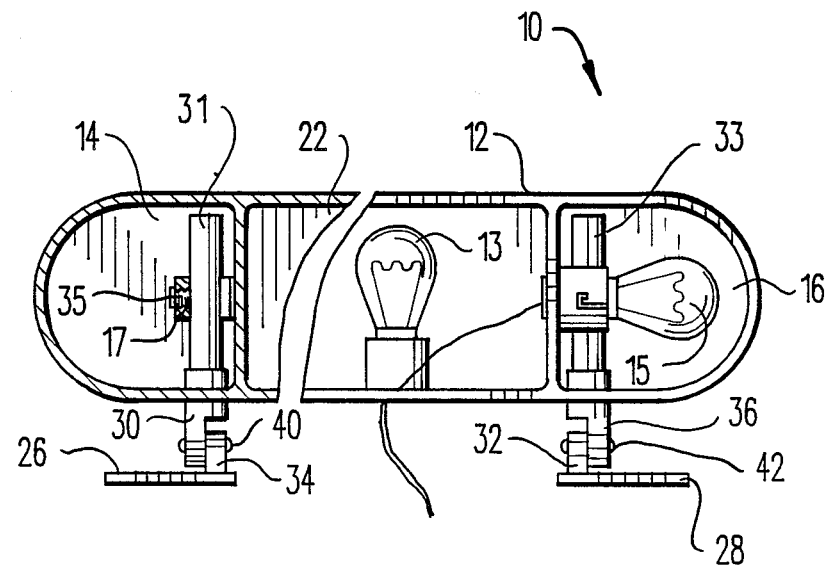
FIG. 6 is a front view, partially cut away and in cross section, illustrating the adjustable mounting bracket of the device of FIG. 5.
FIG. 7 is a detail view, partially cut away, illustrating the interior construction of the device of FIG. 5, with the indicating light compartment lens cover removed.

FIG. 6 provides a front view, partially cut away and in cross section, which illustrates the mounting rod 31 received through a cylindrical central bore of a mounting tab 17 secured within the compartment 14. A set screw 35 in the mounting tab 17 is utilized to clamp the rod 31 in a selected adjusted position. A similar generally vertical mounting rod 33 is provided in the compartment 16, as illustrated in FIG. 7. As may now be understood, the pivotal mounting pins 40 and 42, in conjunction with the vertically adjustable mounting rods 31 and 33 provide for a compound adjustment of the elevation and inclination of the housing 12, with respect to the horizontal surface of the mounting brackets 26 and 28 which, in use, are secured on the horizontal rear deck surface of a vehicle.

Figures 8, 9:
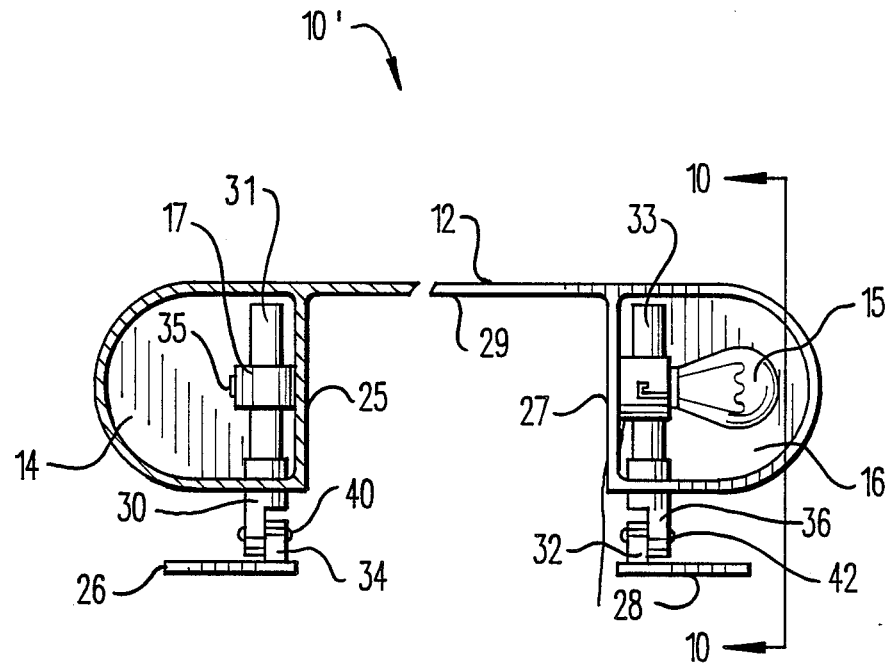
FIG. 8 is a front view, partially in cross section, illustrating the mounting bracket construction of FIG. 3.
FIG. 9 is a front view, partially cut away, illustrating the indicating light compartments of the device of FIG. 3, with the lens cover removed.

FIG. 8 provides a front view, partially in cross section and cut away, illustrating the mounting bracket construction of the second embodiment 10' of the invention. The indicating lamp and lamp socket have been removed for purposes of illustration. The mounting rod 31 is received for sliding movement through a central cylindrical bore of the mounting tab 17 and is secured in an adjusted position by tightening a set screw 35.

FIG. 9 illustrates a front view, partially cut away and with the lens cover removed, which illustrates the interior construction of the indicating light compartment 16.

Figure 10:
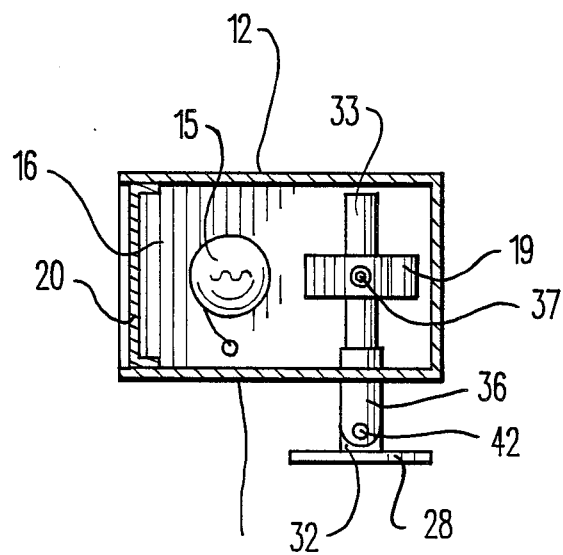
FIG. 10 is a transverse cross sectional view, taken along 10—10 of FIG. 9.

FIG. 10 depicts a cross sectional view, taken along 10—10 of FIG. 9, which further illustrates the adjustable mounting bracket construction. The yoke portion 36 of the mounting rod 33 is pivotally secured by a pin 42 to the vertical tab portion 32 of the mounting bracket 28. The rod 33 is received for vertical sliding movement in a cylindrical central bore of a mounting tab 19 and is secured in a selected adjusted position by tightening a set screw 37.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A auxiliary turn signal attachment, comprising:
   a housing;
   a pair of indicator light compartments at opposite ends of said housing;
   said indicator light compartments separated by a central section;
   an indicator light in each of said compartments;
   adjustable mounting means for mounting said housing adjacent a rear window of a vehicle and for adjusting the height and inclination of said housing with respect to an intended mounting surface;
   said adjustable mounting means including a pair of second brackets each having a plurality of apertures for reception of threaded fasteners;
   a pair of elongated rods pivotally mounted to said brackets and extending through a floor portion of said housing;
   a pair of mounting tabs within said housing, each of said mounting tabs having a cylindrical bore slidably receiving one of said rods; and
   a pair of set screws in said mounting tabs for clamping said rods in an adjusted position.

2. The auxiliary turn signal attachment of claim 1, wherein said central section defines a recess dimensioned to receive a standard auxiliary brake light.

3. The auxiliary turn signal attachment of claim 1, wherein said central section includes a compartment having an auxiliary brake indicating light.

4. An auxiliary turn signal attachment, comprising:
   an elongated housing having opposed end walls;
   a pair of indicator light compartments at opposite ends of said housing;
   an indicating light in each of said compartments;
   a light transmitting lens forming a wall of each of said compartments;
   a central recess section in said housing disposed between said compartments and dimensioned to straddle an existing auxiliary brake light;

mounting bracket means for adjustably mounting said housing adjacent a rear window of a vehicle and for adjusting height and inclination of said housing with respect to an intended mounting surface;

said mounting bracket means comprising a pair of spaced brackets each having a plurality of apertures for the reception of threaded fasteners;

a pair of elongated rods pivotally mounted to said brackets and extending through a floor portion of said housing;

a pair of mounting tabs within said housing, each of said mounting tabs having a cylindrical bore slidably receiving one of said rods; and a pair of set screws in said mounting tabs for clamping said rods in an adjusted position.

5. An auxiliary turn signal attachment, comprising:

a generally rectangular housing having opposed arcuate end walls;

a pair of indicator light compartments at opposite ends of said housing;

an indicating light in each of said compartments;

an amber lens having a translucent window configured as an indicating arrow forming a wall of each of said compartments;

a central recess section in said housing disposed between said compartments and dimensioned to straddle an existing auxiliary brake light;

a pair of spaced brackets each having a plurality of apertures for the reception of threaded fasteners;

a pair of elongated rods pivotally mounted to said brackets and extending through a floor portion of said housing;

a pair of mounting tabs within said housing, each of said mounting tabs having a cylindrical bore slidably receiving one of said rods; and a pair of set screws in said mounting tabs for clamping said rods in an adjusted position.

* * * * *